United States Patent [19]

Jonas et al.

[11] Patent Number: 5,443,623
[45] Date of Patent: Aug. 22, 1995

[54] SORBING APPARATUS WITH GUARD BED

[75] Inventors: Leonard A. Jonas, Baltimore, Md.; Donald H. White, Jr., Homer, N.Y.

[73] Assignee: Pall Corporation, East Hills, N.Y.

[21] Appl. No.: 338,126

[22] Filed: Nov. 9, 1994

Related U.S. Application Data

[63] Continuation of Ser. No. 246,466, May 18, 1994, abandoned, which is a continuation of Ser. No. 83,319, Jun. 29, 1993, abandoned, which is a continuation of Ser. No. 854,750, Mar. 20, 1992, abandoned, which is a continuation of Ser. No. 769,501, Oct. 1, 1991, abandoned, which is a continuation of Ser. No. 427,562, Oct. 27, 1989, abandoned.

[51] Int. Cl.6 .......................................... B01D 53/047
[52] U.S. Cl. .................................... 95/101; 95/105; 95/148; 96/111; 96/116; 96/130
[58] Field of Search ................... 95/14, 26, 92, 93, 96, 95/98, 101, 103, 105, 120, 125, 146, 148; 96/111, 116, 130

[56] References Cited

U.S. PATENT DOCUMENTS

| | | | |
|---|---|---|---|
| 2,880,818 | 4/1959 | Dow | 55/62 |
| 2,910,139 | 10/1959 | Matyear, Jr. | 55/31 X |
| 2,944,627 | 7/1960 | Skarstrom | 55/62 X |
| 2,992,703 | 7/1961 | Vasan et al. | 55/62 |
| 3,061,992 | 11/1962 | Russell | 55/31 |
| 3,102,013 | 8/1963 | Skarstrom | 55/31 |
| 3,144,314 | 8/1964 | Jackson | 55/179 |
| 3,176,444 | 4/1965 | Kiyonaga | 55/26 |
| 3,237,379 | 3/1966 | Kant et al. | 55/62 X |
| 3,519,398 | 7/1970 | Roberts . | |
| 3,594,984 | 7/1971 | Toyama et al. . | |
| 3,891,410 | 6/1975 | Hankison | 55/33 X |
| 3,923,477 | 12/1975 | Armond et al. | 55/58 X |
| 4,060,913 | 12/1977 | Yoshida et al. . | |
| 4,376,639 | 3/1983 | Vo | 55/58 X |
| 4,421,567 | 12/1983 | Kulprathipanja et al. . | |
| 4,431,456 | 2/1984 | Kulprathipanja . | |
| 4,627,856 | 12/1986 | von Gemmingen . | |
| 4,636,225 | 1/1987 | Klein et al. | 55/33 X |
| 4,687,573 | 8/1987 | Miller et al. | 210/143 |
| 4,711,645 | 12/1987 | Kumar | 55/31 X |
| 4,715,867 | 12/1987 | Vo | 55/58 X |
| 4,756,723 | 7/1988 | Sircar | 55/31 X |
| 4,783,432 | 11/1988 | Settlemyer | 55/33 X |
| 4,830,641 | 5/1989 | White, Jr. et al. | 55/161 |

FOREIGN PATENT DOCUMENTS

| | | |
|---|---|---|
| 0146082 | 6/1985 | European Pat. Off. . |
| 1573376 | 5/1980 | United Kingdom . |
| 9007970 | 7/1990 | WIPO . |

OTHER PUBLICATIONS

"The Pressure Swing Adsorption Process"; Donald H. White, Jr.; Amer. Inst. of Chemical Engineers; Session No. 87; 1988.

(List continued on next page.)

Primary Examiner—Robert Spitzer
Attorney, Agent, or Firm—Leydig, Voit & Mayer

[57] ABSTRACT

The disclosure describes a sorbing apparatus for removing one or more undesirable components from an influent gas. The sorbing apparatus comprises at least one chamber having first and second ports and defining a gas flow path between the first and second ports. A sorbent bed having a sorbing region and a guard region is disposed in the sorbing chamber in the gas flow path. The sorbing region includes a first sorbent material and the guard region includes a second sorbent material. A gas control arrangement is coupled to the sorbing chamber to cyclically (1) direct the influent gas through the first port, through the sorbing region and the guard region of the sorbent bed and out the second port wherein the undesirable components are sorbed from the influent gas and (2) direct a purge gas through the second port, through the guard region and the sorbing region of the sorbent bed and out the first port wherein the sorbing region is regenerated. The gas control arrangement is adapted to cycle the influent gas and the purge gas through the sorbing chamber so as to sorb and desorb the undesirable components substantially entirely in the sorbing region of the sorbent bed whereby the guard region serves as a safeguard for the sorbing region.

24 Claims, 1 Drawing Sheet

OTHER PUBLICATIONS

"Regenerable and Non-Regenerable Chemical Warfare Agent Sorption Systems for NBC Collective Protection"; Donald H. White, Jr.; Nov. 1984.

"Get Low Dewpoints with Solid Desiccants"; F. D. Patterson, Jr.; Oil and Gas Journal; Mar. 3, 1969.

"Davison Silica Gels Serving the Hydrocarbon Processing Industry"; W. R. Grace & Co., Baltimore, Md.

"Impregnation of Charcoal"; National Defense Research Committee Division 10; R. J. Grabenstetter et al.

"The Reaction of Oxygen-Nitrogen Mixtures with Granular Activated Carbons Below the Spontaneous Ignition Temperature"; V. R. Deitz; Naval Research Laboratory; Jan. 14, 1983.

"Activated Carbon"; John W. Hassler; Chemical Publishing Co.; New York, N.Y. 1963.

"Gas-Phase Adsorption"; J. L. Kovach; Handbook of Separation Techniques for Chemical Engineers; P. A. Schweitzer; McGraw Hill 1979.

"Adsorption Technology: A Step-by-Step Approach to Process Evaluation and Application"; F. L. Slejko; Marcel Dekker, Inc. 1985.

"Air Purification by Pressure Swing Adsorption"; James A. Ritter & Ralph T. Yang; State Univ. of New York at Buffalo.

"The Design of Pressure Swing Adsorption System"; D. H. White, Jr., et al.; Chemical Engineering Progress, vol. 85/No. 1; Jan. 1989.

"Adsorption", C. L. Mantell, Chemical Engineering Series, McGraw-Hill Book Company, Inc., 1951, pp. 254-275.

"Adsorption Drying Equipment", National Electrical Manufacturers Assoc., Pub. No. AD 1-1964.

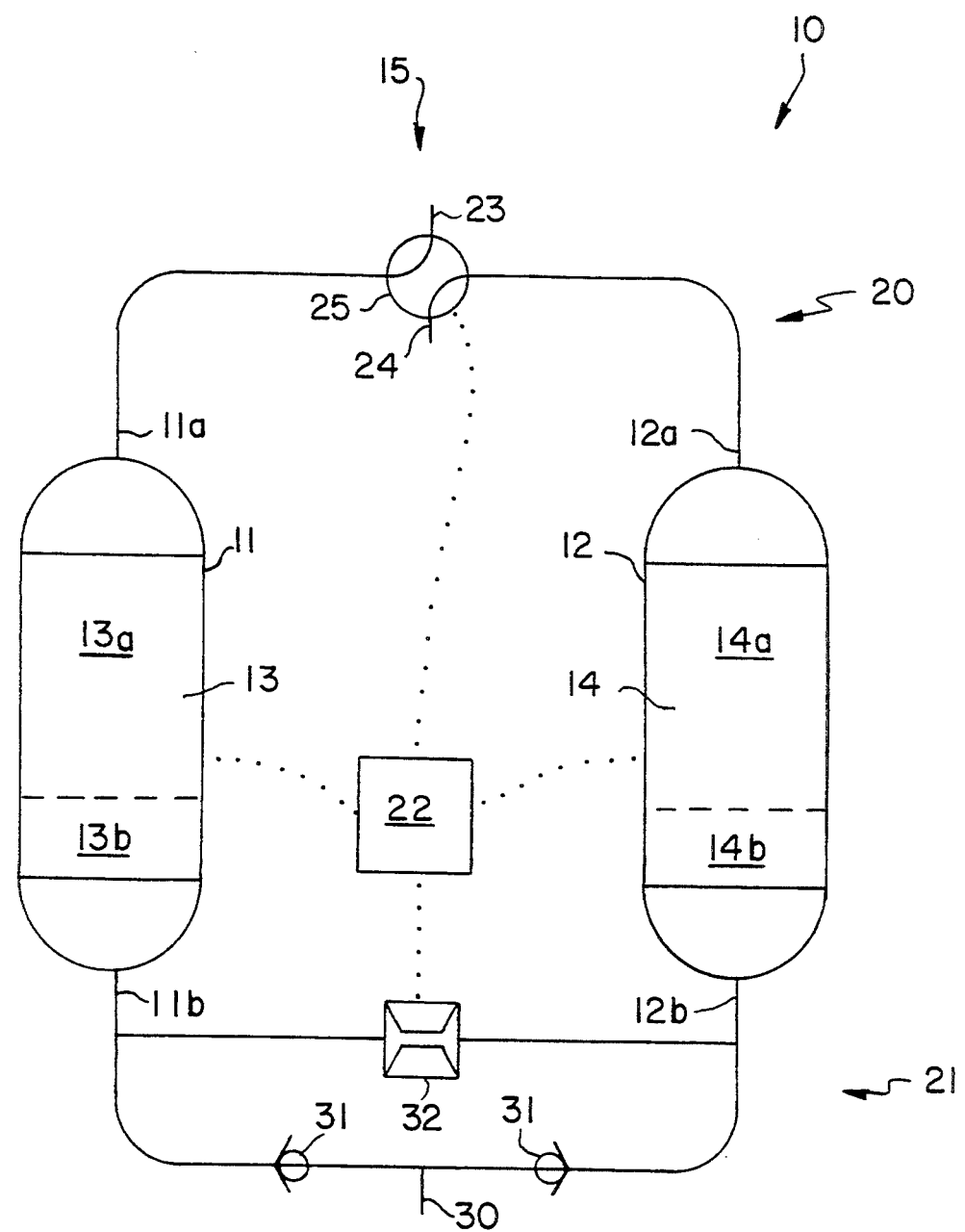

SORBING APPARATUS WITH GUARD BED

This disclosure is a continuation of application Ser. No. 08/246,466, filed May 18, 1994, now abandoned, which is a continuation of prior application Ser. No. 08/083,319, filed Jun. 29, 1993, now abandoned, which is a continuation of prior application Ser. No. 07/854,750, filed Mar. 20, 1992, now abandoned, which is a continuation of prior application Ser. No. 07/769,501, filed Oct. 1, 1991, now abandoned, which is a continuation of prior application Ser. No. 07/427,562, filed Oct. 27, 1989, now abandoned.

TECHNICAL FIELD

The present invention relates to an apparatus and method for sorbing, i.e., adsorbing or absorbing, one or more components from a gas.

Disclosure of the Invention

A gas, in its broadest sense, may include several gaseous components. For example, air is a mixture primarily of nitrogen, oxygen, argon, and carbon dioxide. One or more of the components of a gas may be undesirable. Some undesirable components may be noxious or harmful, even fatal, to people. For example, naturally occurring gases, such as radon, or pollutants, such as carbon monoxide, can be harmful if they are inhaled. Some undesirable components may be harmful in other ways. For example, water vapor in compressed air can condense, forming water which can damage any machinery driven by the compressed air. Some undesirable components are simply extraneous. For example, nitrogen, though not harmful, can be removed from air to produce a breathable gas which is enriched in oxygen.

To remove one or more undesirable components from an influent gas, the present invention provides a sorbing apparatus comprising at least first and second sorbing chambers, first and second sorbent beds, and a gas control arrangement. Each sorbing chamber has first and second ports and defines a gas flow path through the sorbing chamber between the first and second ports. Each sorbent bed includes a sorbing region having a first sorbent material and a guard region having a second sorbent material which is different from the first sorbent material. A sorbent material is one which, because of certain physical and chemical properties, selectively sorbs some components of a gas but not others, and a sorbent material which sorbs the undesirable component, or components, is selected for the sorbent bed. The sorbing region and the guard region of each sorbent bed are disposed in different regions of the same sorbing chamber and may be designed to sorb similar or different undesirable components. The gas control arrangement is coupled to the first and second sorbing chambers to cyclically (1) direct the influent gas through the first sorbing chamber via the sorbing region and the guard region and direct a purge gas through the second sorbing chamber via the guard region and the sorbing region and (2) direct the influent gas through the second sorbing chamber via the sorbing region and the guard region and direct a purge gas through the first sorbing chamber via the guard region and the sorbing region. When the influent gas is directed through the sorbent bed, the undesirable components are sorbed from the gas in the sorbing region during normal operations. A purge gas is one which strips or desorbs the undesirable component from the sorbent material. Consequently, when the purge gas is directed through the sorbent bed, the undesirable substances are desorbed from the sorbent bed and the sorbent bed is regenerated, i.e., cleaned of substantially all of the undesirable components. The gas control arrangement is adapted to cycle the influent gas and the purge gas through the chamber so as to sorb and desorb the undesirable components substantially entirely in the sorbing region of the sorbent bed whereby the guard region of the sorbent bed serves as a safeguard for the sorbing region.

Thus, according to the present invention, the sorbing region of the sorbent bed is the primary sorbent for removing the undesirable components from the gas. Under normal operating conditions, the gas control arrangement cyclically directs the influent gas through the sorbent bed, wherein the sorbing region sorbs the undesirable components, and directs the purge gas in the opposite direction through the sorbent bed, wherein the sorbing region is regenerated. The guard region of the sorbent bed sorbs little or none of the undesirable components during normal operating conditions. However, during abnormal conditions, such as an unexpected heavy concentration of the undesirable component in the influent gas or a temporary failure of the gas control arrangement, the guard region serves as a safeguard and sorbs any undesirable components that may penetrate the sorbing region.

BRIEF DESCRIPTION OF THE DRAWINGS

The FIGURE is a block diagram of an exemplary sorbing apparatus embodying the present invention.

DETAILED DESCRIPTION OF EMBODIMENT

As shown in FIGURE 1, an exemplary sorbing apparatus 10 embodying the present invention generally comprises at least one and preferably first and second sorbing chambers 11, 12, first and second sorbent beds 13, 14 respectively disposed inside the first and second sorbing chambers 11, 12, and a gas control arrangement 15 coupled to the first and second sorbing chambers 11, 12. Each sorbing chamber 11, 12 includes first and second ports 11a, 11b, 12a, 12b, and it may have any suitable configuration and may be formed from any suitably impervious material to define a gas flow path between the first and second ports. For example, in a preferred embodiment, each of the sorbing chambers 11, 12 is formed from a metal, such as steel, and has a generally cylindrical configuration with the first and second ports 11a, 11b, 12a, 12b positioned at opposite ends of the cylinder. Consequently, gas flowing through either port flows generally axially along the chamber and exits at the opposite port.

The sorbent beds 13, 14 may be variously configured, for example, as a loose fill or a compressively loaded fill of sorbent particles or a bed of immobilized sorbent particles which are supported in a fiber matrix or are bound to one another in a self-supporting mass by a binding agent. In accordance with the invention, each sorbent bed 13, 14 includes a sorbing region 13a, 14a and a guard region 13b, 14b. The sorbing region and guard region of each sorbent bed are contained within the sorbing chamber and are preferably contiguous. Alternatively, the sorbing region and the guard region may be separated, for example, by a divider such as a screen or by another region of the sorbent bed. The guard region 13b, 14b communicates with the first port 11a, 12a of the chamber 11, 12 via the sorbing region 13a, 14a and the sorbing region 13a, 14a communicates with the second port 11b, 12b of the chamber 11, 12 via the guard region 13b, 14b.

Each region of a sorbent bed contains a sorbent material capable of sorbing one or more components from the gas. The sorbent material can be a single sorbent or a mixture of sorbents. The sorbing region and the guard region preferably contain different sorbent materials although the two regions may be designed to sorb identical, similar, or different undesirable components. The sorbent material in the guard region can be, but needn't be, regenerable. For example, if the sorbing apparatus 10 is designed to provide air enriched in oxygen, the sorbing region of a sorbent bed may contain a molecular sieve to remove nitrogen while the guard region may contain an activated or impregnated carbon to remove contaminants and insure that the enriched air may be safely inhaled during abnormal conditions. Any suitable organic sorbent, inorganic sorbent, or combinations of sorbents may be included in the guard region. Preferred organic sorbents include activated carbon and impregnated carbon. Preferred inorganic sorbents include 13X molecular sieve, potassium permanganate impregnated activated alumina, permanganated silica gel, and sodium hydroxide impregnated alumina.

The gas control arrangement 15 may include additional temperature sensors and gas sample taps in the vicinity of the sorbing regions or the guard regions to detect excess concentrations of undesirable components, especially if the guard regions include a flammable sorbent material such as carbon. The temperature sensors could be used to shut down the sorbing apparatus if the carbon overheats while the sample taps could be coupled to an alarm to warn personnel of a potential problem if the concentrations become too high.

Because the guard regions serve principally as safeguards for the sorbing regions, the relative size of the sorbing region and the guard region of each sorbent bed may be determined principally according to the amount of time desired to ascertain the cause of the abnormal conditions and rectify the condition prior to contamination of the effluent gas. For example, the guard bed can contain up to 50% of the total weight or volume of sorbent material in the sorbing apparatus 10. Preferably, the guard bed contains less than 25% of the total weight or volume of sorbent material in the sorbing apparatus 10.

The gas control arrangement 15 may be variously configured depending on the intended mode of operation of the sorbing apparatus 10, e.g., whether the sorbing apparatus is a temperature swing or a purge sweep apparatus. For example, in a preferred embodiment, the sorbing apparatus 10 is a pressure swing adsorption apparatus and the gas control arrangement includes an intake structure 20, an outlet structure 21 and a control system 22. The intake structure includes an intake 23 for supplying the gas to the sorbing apparatus 10, exhaust 24 for exhausting a purge gas from the sorbing apparatus 10, and an intake valve assembly 25. The intake valve assembly 25 may be variously configured to connect the intake 23 to the first port 11a, 12a of one of the sorbing chambers 11, 12 while connecting the exhaust 24 to the first port 11a, 12a of the other sorbing chamber 12, 11. For example, the intake valve assembly may include two pairs of solenoid valves coupled to the control system 22 for alternately connecting the first and second sorbing chambers to the intake and exhaust, respectively.

The outlet structure 21 includes an outlet 30 connected to the second ports 11b, 12b of the first and second sorbing chambers 11, 12 by check valves 31 which connect the outlet 30 to only one of the sorbing chambers 11, 12 at a time. The outlet structure 21 further includes a purge valve assembly 32 which interconnects the second ports 11b, 12b of the first and second sorbing chambers 11, 12 allowing a portion of the outlet gas from one sorbing chamber 11, 12 to be used as a purge gas or the other sorbing chamber 12, 11.

The control system 22 is connected to one or more of the intake structure 20, the outlet structure 21, and the first and second sorbing chambers 11, 12 to control the flow of gas through the sorbing chambers 11, 12 in accordance with the mode of operation of the sorbing apparatus 10. For example, in the depicted embodiment, the control system 22, which can be either an electronically or a pneumatically operated system, controls the flow of gas through the sorbing apparatus 10 so that it functions as a pressure swing adsorption apparatus. An influent gas containing one or more undesirable components is directed by the control system 22 from the intake 23 through the intake valve assembly 25 into one of the two sorbing chambers 11, 12. For example, the control system 22 may direct the influent gas through the first port 11a in the first sorbing chamber 11. The influent gas enters the first sorbing chamber 11 at a preselected pressure which, for a pressure swing adsorption apparatus may be in the range of about 30 psig to about 300 psig. After entering the first sorbing chamber 11, the influent gas flows through the first sorbent bed 13, initially passing through the sorbing region 13a where one or more undesirable components are removed from the gas and then through the guard region 13b. An effluent gas containing none of, or at least a much lower concentration of, the undesirable components then exits the first sorbing chamber 11 through the second port 11b. The effluent gas is then directed by the check valves 31 of the outlet structure 21 to the outlet 30.

As the influent gas continues to flow through the first sorbing bed 13, both the mass transfer front and the heat transfer front advance along the sorbent bed 11. The control system 22 may be coupled through the first sorbing chamber 11 to the first sorbent bed 13 in order to detect the advance of one or both of these fronts. For example, a temperature sensor may be used to detect the advance of the temperature front and a capacitance probe may be used to detect the mass transfer front in a compressed air dryer. Before the mass transfer front reaches the guard region 11b of the sorbent bed 11, the control system 22 redirects the influent gas to the first port 12a of the second sorbing chamber 12. Alternatively, rather than monitor the advance of the mass transfer and heat transfer fronts directly, the control system 22 may be arranged to automatically redirect the influent gas after a predetermined period of time. This predetermined period of time is sufficient to allow a significant amount of sorption in the sorbing region 13a but prevent the mass transfer front from reaching the end of the sorbing region 13b during normal operating conditions. It may be calculated for any given bed configuration and desired flow.

The redirected influent gas enters the second sorbing chamber 12 at the preselected pressure and passes through the sorbent bed 14, first through the sorbing region 14a where the undesirable components are removed from the gas and then through the guard region 14b. An effluent gas containing none of, or at least a much lower concentration of, the undesirable components then exits the second sorbing chamber 12 through the second port 12b. The effluent gas is then directed by the check valves 31 of the outlet structure 21 to the outlet 30.

To regenerate the sorbing region 13a in the first sorbent bed 13 a portion of the effluent gas is used as a purge fluid and is passed from the second port 12b of the second sorbing chamber 12 through the purge valve assembly 32 to the second port 11b of the first sorbing chamber 11. When the control system 22 redirected the influent gas from the first sorbing chamber 11 to the second sorbing chamber 12, the first port 11a was connected to the exhaust 24 through the intake valve assembly and the first sorbing chamber 11 was depressurized. The exhaust preferably is at atmospheric pressure or subatmospheric pressure, including a vacuum. As the purge gas flows through the first sorbing chamber 11, the sorbent material in the sorbent bed 13, which was warmed by the heat of adsorption when the influent gas was being passed through the first sorbing chamber 11, desorbs, i.e., elutes, purges, strips, or in any way removes, the undesirable component from the sorbent material into the purge gas. The exhaust gas, having a high concentration of the undesirable component, then exits the first sorbing chamber 11 through the first port 11a and is directed via the intake valve assembly 25 to the exhaust 24.

Once the sorbing region 13a in the first sorbent bed 13 has been sufficiently regenerated, the control system 22 can disconnect the first port 11a of the first sorbing chamber 11 and the exhaust 24, allowing repressurization of the first sorbing chamber 11. Then, the control system 22 redirects the influent gas from the intake 23, through the intake valve assembly 25 to the first port 11a of the first sorbing chamber 11 while at the same time connecting the first port 12a of the second sorbing chamber 12 to the exhaust 24. The gas control arrangement 15 continues this process of cyclically sorbing the undesirable components from the influent gas in the sorbing region 13a of the first sorbent bed 13 while regenerating the sorbing region 14a of the second sorbent bed 14 and then sorbing the undesirable components from the influent gas in the sorbing region 14a of the second bed 14 while regenerating the sorbing region 13a of the first sorbent bed 13. Typical cycle times for a sorbing apparatus operating as a pressure swing adsorption apparatus are in the range from about 2 seconds to about 30 minutes, preferably, about 10 seconds to about 20 minutes, and, more preferably, about 20 seconds to about 10 minutes.

Thus, during normal operating conditions, the gas control arrangement cycles the influent gas and the purge gas through the sorbing chambers so as to sorb and desorb the undesirable components substantially entirely in the sorbing regions of the sorbent beds. The guard regions sorb little or none of the undesirable components and do not serve to enhance the performance of the sorbing regions during normal operating conditions. However, the guard regions do serve as safeguards for the sorbing regions to prevent penetration of the undesirable components into the effluent gas during abnormal conditions. These abnormal conditions include, for example, an unexpected undesirable component which the sorbing regions are not designed to remove or an unexpectedly heavy concentration of an undesirable component which may swamp the sorbing regions. Improper operation of the gas control arrangement is another abnormal condition. For example, if the gas control arrangement fails to sufficiently desorb the undesirable component from the sorbing region during each regeneration portion of the cycle, the mass transfer front can advance the entire length of the sorbing region, allowing the undesirable component to contaminate the effluent gas in the absence of a guard region. In addition, these abnormal conditions include the operation of the sorbing apparatus during transient conditions. For example, during start-up, when a pressure swing adsorption apparatus is not operating at steady state conditions, the apparatus is operating at less than maximum efficiency. Consequently, the undesirable component may penetrate the sorbing region and contaminate the effluent gas in the absence of a guard region. However, during all of these abnormal conditions, the guard regions act as a safeguard for the sorbing regions and sorb any undesirable component that the sorbing regions fail to remove, preventing contamination of the effluent gas and, thus, ensuring the reliability of the sorbing apparatus.

Although the present invention has been described in terms of a particular embodiment, it is not limited to that embodiment. Alternative embodiments and modifications, which would still be encompassed by the invention, may be made by those skilled in the art, particularly in light of the foregoing teachings. Therefore, the following claims are intended to cover any alternative embodiments, modifications or equivalents which may be included within the spirit and scope of the invention as defined by the claims.

We claim:

1. A method for removing one or more components from an influent gas, the method comprising:
   cyclically (1) directing the influent gas in a first direction through a first sorbing chamber containing both a sorbing region having a first sorbent material and a guard region having a second sorbent material different from the first sorbent material and sorbing the components from the influent gas in the sorbing region of the first sorbing chamber, and directing a purge gas in a second direction through a second sorbing chamber containing both a sorbing region having a first sorbent material and a guard region having a second sorbent material different from the first sorbent material and regenerating the sorbing region of the second sorbing chamber and (2) directing the influent gas in a first direction through the second sorbing chamber and sorbing the components from the influent gas in the sorbing region of the second sorbing chamber and directing a purge gas in a second direction through the first sorbing chamber and regenerating the sorbing region of the first sorbing chamber; and
   cycling the influent gas during normal operations between the first and second sorbing chambers so as to sorb the components substantially entirely in the sorbing region of each sorbing chamber and to sorb little or none of the components in the components in the guard region of the sorbing chamber, whereby the guard region serves as a safeguard for the sorbing region.

2. The method of claim 1 further comprising cycling the influent gas between the first and second sorbing chambers according to a cycle time in the range from about 2 seconds to about 30 minutes.

3. The method of claim 2 wherein directing the influent gas through the first or second sorbing chamber includes directing the influent gas into the sorbing chamber at a pressure in the range from about 30 psig to about 300 psig.

4. The method of claim 3 further comprising directing the purge gas from the first or second sorbing chamber to an exhaust at a pressure at about 1 atmosphere or less.

5. A sorbing apparatus for removing one or more components from an influent gas, the sorbing apparatus comprising:

first and second sorbing chambers, each sorbing chamber being formed from an impervious material, having first and second ports, and defining a gas flow path through the sorbing chamber between the first and second ports;

a first sorbent bed having a sorbing region and a guard region disposed in the first sorbing chamber in the gas flow path, the sorbing region including a first sorbent material and the guard region including a second sorbent material, wherein the first sorbent material and the second sorbent material are both disposed in the first sorbing chamber in different regions and the first sorbent material is different from the second sorbent material;

a second sorbent bed having a sorbing region and a guard region disposed in the second sorbing chamber in the gas flow path, the sorbing region including a first sorbent material and the guard region including a second sorbent material, wherein the first sorbent material and the second sorbent material are both disposed in the second sorbing chamber in different regions and the first sorbent material is different from the second sorbent material; and a gas control arrangement coupled to the first and second sorbing chambers to cyclically (1) direct the influent gas through the first sorbing chamber via the first port, the sorbing region and the guard region of the first sorbent bed, and the second port, wherein the components are sorbed from the influent gas substantially entirely in the sorbing region of the first sorbent bed, and direct a purge gas through the second sorbing chamber via the second port, the guard region and the sorbing region of the second sorbent bed, and the first port, wherein the sorbing region of the second sorbent bed is regenerated and (2) direct the influent gas through the second sorbing chamber via the first port, the sorbing region and the guard region of the second sorbent bed, and the second port, wherein the components are sorbed from the influent gas substantially entirely in the sorbing region of the second sorbent bed, and direct a purge gas through the first sorbing chamber via the second port, the guard region and the sorbing region of the first sorbent bed, and the first port, wherein the sorbing region of the first sorbent bed is regenerated, the gas control arrangement being adapted to cycle the influent gas and the purge gas through the first and second sorbing chambers so as to sorb and desorb the components substantially entirely in the sorbing region of the sorbent beds and to sorb little or none of the components in the guard region of the sorbent beds, whereby each guard region serves as a safeguard for each sorbing region.

6. The sorbing apparatus of claim 5 wherein the second sorbent material of each sorbent bed includes activated or impregnated carbon.

7. The sorbing apparatus of claim 5 wherein the second sorbent material of each sorbent bed includes 13X molecular sieve.

8. The sorbing apparatus of claim 5 wherein the sorbing region of each sorbent bed and the guard region are contiguous.

9. The sorbing apparatus of claim 5 wherein the gas control arrangement is adapted to direct the purge gas through the second port of each sorbing chamber before the mass transfer front reaches the guard region of the sorbent bed.

10. The sorbing apparatus of claim 5 wherein the guard region of each sorbent bed has less than about 50% of the total sorbent material in the sorbent bed.

11. The sorbing apparatus of claim 5 wherein the first sorbent material in each sorbent bed comprises a mixture of sorbents.

12. The sorbing apparatus of claim 5 wherein the second sorbent material in each sorbent bed comprises a mixture of sorbents.

13. The sorbing apparatus of claim 5 wherein the gas control arrangement cycles influent gas between the first and second sorbing chambers in accordance with a predetermined period of time.

14. The sorbing apparatus of claim 13 wherein the predetermined period of time is in the range from about 2 seconds to about 30 minutes.

15. The sorbing apparatus of claim 5 wherein the gas control arrangement directs influent gas through each sorbing chamber at a pressure in the range of from about 30 psig to about 300 psig and directs purge gas from each sorbing chamber at an exhaust pressure of about 1 atmosphere or less.

16. The sorbing apparatus of claim 15 wherein the gas control arrangement cycles influent gas between the first and second sorbing chambers in accordance with a cycle time in the range from about 2 seconds to about 30 minutes and wherein the guard region of each sorbent bed has less than about 25% of the total sorbent material in the sorbent bed.

17. A pressure swing sorption apparatus for removing one or more components from an influent gas, said apparatus comprising:

an intake, an outlet, and an exhaust;

first and second sorbing chambers, each sorbing chamber being formed from an impervious material, having first and second ports, and defining a gas flow path through the sorbing chamber between the first and second ports;

first and second sorbent beds respectively disposed in the gas flow path in the first and second sorbing chambers, each sorbent bed including a sorbing region disposed in the sorbing chamber and having a first sorbent material and a guard region disposed in the same sorbing chamber and having a second sorbent material different from the first sorbent material, the sorbing region communicating with the second port of the sorbing chamber via the guard region and the guard region communicating with the first port of the sorbing chamber via the sorbing region;

an intake structure interconnecting the intake, the exhaust, and the first ports of the first and second sorbing chambers;

an outlet structure interconnecting the outlet and the second ports of the first and second sorbing chambers; and a gas control arrangement coupled to one or more of the intake structure, the outlet structure, and the first and second sorbing chambers for cyclically (1) directing the influent gas from the intake through the first sorbing chamber via the sorbing region and the guard region of the first sorbent bed to the outlet while channeling a portion of the effluent gas through the second sorbing chamber via the guard region and the sorbing region of the second sorbent bed to the exhaust and (2) directing the influent gas from the intake through the second sorbing chamber via the sorbing region and the guard region of the second sorbent bed to the outlet while channeling a portion of the effluent gas through the first sorbing chamber via the guard region and the sorbing region of the first sorbent bed to the exhaust, the gas control arrangement being adapted to cycle the influent gas and the effluent gas through the sorbent beds so as to sorb and desorb the components substantially entirely in the sorbing region of the sorbent beds and to sorb little or none of the components in the guard region of the sorbent beds, whereby each guard region serves as a safeguard for each sorbing region.

18. The pressure swing sorption apparatus of claim 17 wherein the gas control arrangement directs the influent gas into each sorbent bed at a first pressure and directs the effluent gas into each sorbent bed at a second lower pressure.

19. The pressure swing absorption apparatus of claim 18 wherein the first pressure is in the range from about 30 psig to about 300 psig and wherein the second pressure is in the range of about 1 atmosphere or less.

20. The pressure swing absorption apparatus of claim 19 wherein the gas control arrangement cycles influent gas between the first and second sorbing chambers in accordance with a cycle time in the range from about 2 seconds to about 30 minutes and wherein the guard region of each sorbent bed has less than about 25% of the total sorbent material in the sorbent bed.

21. The pressure swing sorption apparatus of claim 17 wherein the sorbing region and the guard region of each sorbent bed are contiguous.

22. The pressure swing sorption apparatus of claim 17 wherein the gas control arrangement has a cycle time in the range from about two seconds to about 30 minutes.

23. The pressure swing sorption apparatus of claim 22 wherein the gas control arrangement has a cycle time in the range from about 20 seconds to about 10 minutes.

24. A sorption system for removing one or more components from an influent gas, the sorption system comprising:

first and second sorbing chambers being formed from an impervious material, having first and second ports, and defining a gas flow path between the first and second ports;

a gas control means coupled to the first and second sorbing chambers for cyclically (1) directing influent gas through the first sorbing chamber from the first port along the gas flow path to the second port and directing purge gas through the second sorbing chamber from the second port along the gas flow path to the first port and (2) directing influent gas through the second sorbing chamber from the first port along the gas flow path to the second port and directing a purge gas through the first sorbing chamber from the second port along the gas flow path to the first port; and sorbent beds respectively positioned in the first and second sorbing chambers in the gas flow path, each sorbent bed including sorbing means having a first sorbent material for sorbing components from the influent gas and guard means for sorbing negligibly little of the components during normal conditions but substantially sorbing the components that penetrate the sorbing means during abnormal conditions, the guard means including a second sorbent material different from the first sorbent material, wherein the first sorbent material and the second sorbent material of each sorbent bed are positioned in the gas flow path in the same sorbing chamber and the sorbing means communicates with the second port of the sorbing chamber via the guard means and wherein the gas control means includes means for cycling the influent gas during normal operations between the first and second sorbing chambers before the component mass transfer front advances the entire length of the sorbing means, whereby the guard means serves as safeguard for the sorbing means.

* * * * *